United States Patent [19]

Albini et al.

[11] Patent Number: 4,957,979
[45] Date of Patent: Sep. 18, 1990

[54] METHOD OF MAKING AND USING THERMOPLASTIC BLOCK COPOLYMERS

[75] Inventors: Italo Albini, Pavia, Italy; Werner Gruber, Korschenbroich, Fed. Rep. of Germany; Norbert Wiemers, Monheim, Fed. Rep. of Germany; Juergen Wichelhaus, Wuppertal, Fed. Rep. of Germany; Roberto Leoni, Mailand, Italy; Angela Rossini, Mailand, Italy

[73] Assignee: Henkel Kommanditgesellschaft auf Aktien, Duesseldorf-Holthausen, Fed. Rep. of Germany

[21] Appl. No.: 281,861

[22] Filed: Dec. 5, 1988

Related U.S. Application Data

[63] Continuation of Ser. No. 102,280, Sep. 28, 1987, abandoned, which is a continuation of Ser. No. 829,377, Feb. 13, 1986, abandoned.

[30] Foreign Application Priority Data

Feb. 13, 1985 [DE] Fed. Rep. of Germany ....... 3504805

[51] Int. Cl.$^5$ ............................................. C08G 69/48
[52] U.S. Cl. .................................. 525/420.5; 525/424
[58] Field of Search ............................. 525/420.5, 424

[56] References Cited

U.S. PATENT DOCUMENTS

| | | | |
|---|---|---|---|
| 2,830,038 | 4/1958 | Pattison | 260/77.5 |
| 3,020,251 | 2/1962 | Russell | 260/18 |
| 3,428,710 | 2/1969 | Daumiller et al. | 260/857 |
| 4,018,733 | 4/1977 | Lopez et al. | 260/27 |
| 4,059,549 | 11/1977 | Brinkmann et al. | 260/22 TN |
| 4,134,866 | 1/1979 | Tominaga et al. | 525/424 |
| 4,384,083 | 5/1983 | Baker | 525/424 |
| 4,448,936 | 5/1984 | Wang et al. | 525/424 |
| 4,500,604 | 2/1985 | Herold et al. | 525/424 |
| 4,578,447 | 3/1986 | Humphrey | 525/424 |
| 4,617,355 | 10/1986 | Gabbert et al. | 525/424 |
| 4,734,462 | 3/1988 | Liedloff et al. | 525/424 |

FOREIGN PATENT DOCUMENTS

| | | | |
|---|---|---|---|
| 1644813 | 1/1971 | Fed. Rep. of Germany . | |
| 3504805 | 8/1986 | Fed. Rep. of Germany | 525/42.5 |
| 1379974 | 10/1964 | France . | |
| 38981 | 11/1971 | Japan | 525/424 |
| 14439 | 1/1973 | Japan | 525/424 |
| 25439 | 6/1974 | Japan | 525/424 |
| 093875 | 2/1981 | Japan | 525/424 |
| 1243238 | 8/1971 | United Kingdom . | |

*Primary Examiner*—John C. Bleutge
*Assistant Examiner*—David W. Woodward
*Attorney, Agent, or Firm*—Ernest G. Szoke; Wayne C. Jaeschke; Daniel S. Ortiz

[57] ABSTRACT

Methods of producing thermoplastic poly(amide-urethane) block copolymers having excellent flexibility at low temperatures are provided. The methods comprise reacting substantially linear polyamides, the polyamides being based on dimerized fatty acids and terminated by carboxyl and/or amino groups and aliphatic or cyloaliphatic polyethers and/or reaction products thereof with 2,3-epoxypropanol. The reaction products contain substantially no free isocyanate groups or epoxide groups. The invention also relates to the use of these products as adhesives and corrosion inhibitors for metallic and/or wooden materials.

11 Claims, No Drawings

METHOD OF MAKING AND USING THERMOPLASTIC BLOCK COPOLYMERS

This application is a continuation of application Ser. No. 102,280, filed 9-28-87, now abandoned, which is a continuation of application Ser. No. 829,377, filed 2-13-86, now abandoned.

BACKGROUND OF THE INVENTION

1. Field of the Invention

This invention relates to thermoplastic poly(amide-urethane) block copolymers which are characterized by excellent flexibility at low temperatures and by good adhesion to a wide variety of surfaces.

2. Description of Related Art

Thermoplastic polymers have been successfully used in the production of hotmelt adhesives and are widely used in industry for bonding a variety of materials and surfaces. Copolymers based on ethylene and vinyl acetate, copolyamides based on caprolactam, copolyesters based on terephthalic acid and other polybasic carboxylic acids and various glycols, polyurethanes and polyester urethanes, and polyamides based on dimer acids have all been successfully used in this field. However, the requirements which these materials must satisfy are becoming increasingly more stringent so that modifications are frequently necessary. For example, it is frequently necessary to improve the properties of the starting materials by the addition of other polymers to a thermoplast base or by the incorporation of resins, plasticizers or other auxiliaries. In these modifications, particularly the modification of polyamides based on dimerized fatty acids, and optionally with the addition of sebacic acid and various amines, the thermoplast bases become incompatible, at certain desired temperature ranges, with other starting materials used for producing hotmelts.

U.S. Pat. No. 4,018,733 discloses a typical prior art hot melt adhesive composition comprising an acidic ethylene polymer, a polyamide, and a tackifier.

In order to obtain optimal properties, especially at low temperatures, and more particularly optimal properties for use in the adhesive field, the present invention seeks to solve the problem of reproducibly providing, by chemical modification, polyamides based on dimer acids and amines which do not have any of the above-mentioned disadvantages. More particularly, the invention seeks to provide block copolymers which are characterized by excellent adhesion to a wide variety of surfaces and which, in addition, have excellent flexibility at low temperatures. Finally, the invention seeks to provide block copolymers having excellent adhesion and cohesion properties and which afford corrosion protection to metals and wood.

DESCRIPTION OF THE INVENTION

These and other objects of the present invention are met by a method of making thermoplastic poly(amide-urethane) block copolymers having excellent flexibility at low temperatures and improved adhesion properties, comprising reacting:

(a) a substantially linear polyamide, having terminal groups selected from the group consisting of amino and carboxyl groups, the polyamide being based on a dimerized fatty acid and an aliphatic or cycloaliphatic diamine; and (b) one or more agents selected from the group consisting of substantially linear, isocyanate-terminated aliphatic polyethers and reaction products of the aliphatic polyethers with 2,3-epoxy propanol (glycidol); to form a block copolymer product containing substantially no free isocyanate groups or epoxide groups.

The processes of the present invention may be carried out either in a melt or in the presence of an aprotic solvent. Suitable solvents include, for example, aromatic hydrocarbons, such as toluene, xylene, nitrobenzene or chlorobenzene and esters, such as ethyl acetate, methyl propionate and, chlorinated hydrocarbons, such as methylene chloride or tetrachloroethane.

The reaction is generally carried out at a temperature of from about 40° C. to 150° C. and preferably at a temperature of about 70° C. to 100° C. over a period of about 30 minutes to 3 hours. To isolate the reaction products, the solvent is distilled off, preferably under reduced pressure, except in special cases where the reaction solution can be further used.

The thermoplastic poly(amide-urethane) block copolymers are preferably produced from substantially linear polyamides which have been obtained by the condensation of from about 20 to 49.5 mole % of a dimerized fatty acid, from about 0.5 to 15 mole % of a monomeric fatty acid having a chain length of from about 14 to 22 carbon atoms and from about 20 to 49.5 mole % of an aliphatic or cycloaliphatic diamine containing from 2 to 40 and preferably from 2 to 12 carbon atoms in the molecule. The acid and amine numbers of the starting polyamides should be between about 0.3 and 50 and preferably between about 1 and 15. The dimerized fatty acids are derived from fatty acids containing from 14 to 22 carbon atoms, and preferably, 16 or 18 carbon atoms.

In the context of the invention, the term "block copolymers" includes copolymers having a block-like structure and obtained by polycondensation or polyaddition reactions.

The polyamides based on dimerized fatty acids may be modified in a known manner with regard to their acid component. To this end, condensation of the polyamides may be carried out in the presence of other carboxylic acids, namely mono- and dicarboxylic acids containing from 4 to 36 carbon atoms, such as sebacic acid, adipic acid and/or montanic acids of various chain lengths. However, these other carboxylic acids should be used in limited quantities of no more than about 25 mole %, and preferably, no more than about 15 mole %, based on the total acid component.

As examples of diamines which may be used in the production of the starting polyamides, particular preference is given to low molecular weight diamines such as ethylene diamine, propylene diamine, hexamethylene diamine and piperazine. In addition, so-called dimer acid diamines which are produced by hydrogenating dimerized fatty acids via their nitriles to the corresponding amines may also be used. Fatty acid diamines such as these are generally used in only limited quantities, together with the short-chain $C_2$–$C_{12}$ diamines.

Polyether glycols derived from OH-terminated aliphatic diols are preferably used for the production of the substantially linear isocyanate-terminated aliphatic polyethers. The aliphatic diols contain from 2 to 6 carbon atoms and preferably from 3 to 4 carbon atoms in the carbon chain. The polyether glycols also may be prepared in a known manner by the polymerization of corresponding epoxides using H-acid compounds, but especially of the aliphatic diols themselves as starter molecules. These substantially linear polyether glycols are sold commercially and are available in a variety of molecular weights. The polyether glycols generally used are those having molecular weights of from about 300 to 4000 and preferably from 1000 to 3000. These commercial polyether glycols are produced, for example, by the polyaddition of propylene oxide or by ring-opening polymerization of tetrahydrofuran. Examples of suitable polyether glycols include polyoxypropylene glycol and polyoxytetramethylene glycol.

The OH-terminated polyethers are then reacted in a known manner under anhydrous conditions and in the presence of known catalysts, such as benzoyl chloride, with diisocyanates in molar ratios such that the starting ratio of OH groups to NCO groups is from 1:1 to 1:2 and preferably from 1:1.1 to 1:1.6. Isocyanate-terminated polyethers (i.e. (poly)urethanes) are thus obtained. Examples of suitable compounds for reaction with the OH-terminated polyethers include commercially available diisocyanates such as tolylene diisocyanate, methylene diphenyl diisocyanate (diphenylmethane diisocyanate) and isophorone diisocyanate (3-isocyanato-3,5,5-trimethyl cyclohexyl isocyanate).

The reaction of the starting polyamides with the linear isocyanate-terminated aliphatic polyethers is preferably carried out in the presence of an organic aprotic solvent of the kinds mentioned above.

In one preferred embodiment, the isocyanate-terminated aliphatic polyether is first reacted with 2,3-epoxy propanol (glycidol) before reaction with the polyamide. Epoxide-terminated prepolymers are obtained by this preliminary reaction.

The production of the poly(amide-urethane) block copolymers in accordance with the invention is then carried out as described above. The poly(amide-urethane) block copolymers have the following characteristic structures (including in particular those derived from the "glycidol reaction"):

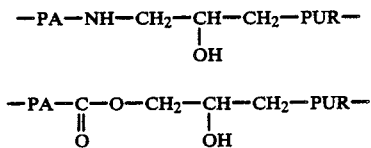

wherein PA represents the polyamide chain and PUR the isocyanate-terminated polyether chain. The free terminal groups of "PA" and "PUR" derive automatically from the equivalent ratios, i.e., the terminal groups of the components used in the molar excess are present. Terminal amino groups or terminal carboxyl groups are preferred. Both diblock systems (PA-PUR) and multiblock systems, in particular PA-PUR-PA, are possible.

The reactions of the present invention provide block copolymers containing both ether and ester bonds and also carbonamide and possibly even urea bonds. Accordingly, the invention provides a process for producing a variety of block copolymers. In addition to their outstanding flexibility at low temperatures, the block copolymers are distinguished by resistance to a broad range of chemicals and outstanding adhesion properties to a wide variety of materials and surfaces, including metals and high molecular weight materials. Similarly remarkable is the cohesion of shaped structures, especially adhesive and coating layers, produced with the new block polymers.

It is thus possible to produce firmly adhering coatings, on a variety of substrates, which may be converted back to an adhesive state simply by heating.

The block polymers produced by the described process generally have softening points of from about 70° to 180° C. and preferably from about 80° to 140° C. The viscosity of the block cocopolymers at 210° C. is in the range of from about 1000 to 50,000 mPa.s and preferably in the range of from about 3000 to 40,000 mPa.s.

In addition to good adhesion to metals which has already been mentioned, the poly(amide-urethane) block copolymers also provide excellent adhesion to a variety of high-melting thermoplasts and to duroplasts. Thus, bonds may be established with high-melting polyamides and polyterephthalates, polyethylene, polypropylene, polystyrene, polyvinyl chloride and also with a variety of rubbers, particularly synthetic rubbers, such as for example styrene-butadiene rubber (SBR) or ethylene-propylene-diene terpolymers (EPDM).

The glycidol-modified block copolymers according to the invention are distinguished by particularly high flexibility. In addition, their adhesion to metals is remarkable. Accordingly, they may be used as hotmelt adhesives or even as coating materials. The block copolymers according to the invention may be used either in the form of a melt (hotmelt) or even powder lacquers. They may of course also be used as adhesives in suitable solvents, optionally with the addition of the usual auxiliaries.

It is indeed surprising that, by this form of modification which may also be described as a chemical combination, incompatible components such as fatty acid polyamides and polyurethanes can be made compatible with one another so that it is now possible to produce thermoplastic block polymers which are superior in many respects to known polymers and polymer mixtures.

Although certain embodiments of the invention have been selected for description in the examples hereinafter, it will be appreciated by those skilled in the art that these examples are merely illustrative of, but do not in any way limit, the scope of the present invention which is defined in the appended claims.

EXAMPLES

Isocyanate- or epoxide-terminated polyalkyleneglycol-based prepolymers, known per se or produced in a known manner, were reacted with amino- or carboxyl-terminated polyamides based on dimerized fatty acids in order to produce the block copolymers according to the present invention. Their production and characteristic properties are described hereinbelow.

Prepolymer A

In a 2-liter flask, 581 g of polyoxypropylene glycol having an average molecular weight of 2000 (OH number 55), 0.3 g of benzoyl chloride and 92 g of diphenylmethane diisocyanate were stirred in 450 ml of anhydrous ethylacetate at 65° C. A solution of the NCO adduct in ethylacetate (isocyanate content 0.5% by weight) having a solids content of 60% by weight was obtained after 3 hours. Corresponding solutions of the NCO adduct in xylene and in toluene were also prepared.

Prepolymer B 37 g of 2,3-epoxy propanol were added to the solution of the NCO adduct in ethylacetate described as prepolymer A, followed by stirring for 2 hours at 70° C. in an inert gas atmosphere. After stirring, the NCO content had fallen to zero. The epoxide number was 2.0.

Prepolymer C 103 g of diphenylmethane diisocyanate in 480 ml of anhydrous xylene and 0.3 g of benzoyl chloride were added to 618 g of polyoxytetramethylene glycol having an average molecular weight of 2000 (OH number 56.1), followed by stirring for 3 hours at 70° C. in the absence of moisture. 35.9 g of 2,3-epoxypropanol were added to the resulting solution which had a solids content of 60% by weight (NCO content 0.5%). After 3 hours at 65° C., the NCO content had fallen to zero.

Polyamides D, E and F were produced in a known manner by condensation at temperatures ranging from 180° to 210° C. The quantities of reactants used and the properties of the polyamides are set forth hereinbelow. The following methods were used to measure the polyamide properties:

| Softening point (SP): | ring- and ball-method according to ASTM E 28 |
| --- | --- |
| Viscosity: | Brookfield RVT, spindel 27 |
| Mandrell breaking point: | ASMT D 3111 |
| Tensile shear strength: | DIN 53283 at RT |
| Crosshead speed: | 50 mm/sec. |

All percentages reported are percent by weight. The properties of the reaction products are listed to the right. The dimerized fatty acid ($C_{18}$) contained 1% by weight of monomeric and 4% of trimeric components.

| Polyamide D | |
| --- | --- |
| 73.0% dimerized fatty acid | SP: 105° C. |
| 19.0% dimer fatty amine | Viscosity: 4,250 mPa.s at 210° C. |
| 8.0% ethylene diamine | Amine number: 5.2 |
| | Mandrell breaking point: −30° C. |
| Polyamide E | |
| 85.0% dimerized fatty acid | SP: 130° C. |
| 10.0% piperazine | Viscosity: 5,000 mPa.s at 210° C. |
| 5.0% azelaic acid | Acid number: 4.0 |
| | Mandrell breaking point: −10° C. |
| Polyamide F | |
| 71.0% dimerized fatty acid | SP: 101° C. |
| 19.0% dimer fatty amine | Viscosity: 3,300 mPa.s at 210° C. |
| 10.0% ethylene diamine | Amine number: 10.4 |
| | Mandrell breaking point: −15° C. |

EXAMPLES 1-6

The production of poly(amide-urethane) block copolymers in accordance with the invention was carried out with stirring over a period of 1 or 2 hours at a temperature of 70° to 100° C. in an approximately 35% by weight solution in ethylacetate, toluene or xylene. The solvent was then distilled at a reduced pressure of 1.3 KPa. The type and quantity of the polyamide and prepolymer reactants, and the measured softening point, viscosity at 210° C. and Mandrell breaking point temperature for Examples 1-6 are presented in Table 1 below. The type of reaction solvent medium (ethylacetate=E, toluene=T, xylene=X) is shown in the last column of Table 1.

TABLE 1

| Example No. | Polyamide amount/type | Prepolymer amount/type | Viscosity mPa.s at 210° C. | Softening Range ring and ball in °C. | Mandrell Breaking Point Temp. °C. | Reaction Medium |
| --- | --- | --- | --- | --- | --- | --- |
| 1 | 180 g/D | 33.4 g/B | 5,225 | 95-100-101 | −50° | X |
| 2 | 100 g/E | 20.0 g/B | 5,820 | 122-125-127 | −55° | T |
| 3 | 180 g/F | 33.4 g/B | 3,660 | 89.5-93-95.5 | −35° | X |
| 4 | 180 g/D | 33.4 g/A | 5,060 | 99-102-103 | −40° | E |
| 5 | 225 g/D | 120.0 g/A | 35,000 | 86.5-99-103 | −60° | T |
| 6 | 180 g/D | 33.4 g/C | 6,300 | 96-101-102.5 | −40° | X |

EXAMPLE 7

The products produced in accordance with Example 1 were formed into sticks measuring 11.3×60 mm which were used to form bonds between various materials by means of a commercial hotmelt gun. The values determined for tensile shear strength are presented in Table 2 for comparison with the values (in parentheses) obtained with the unmodified polyamide D.

TABLE 2

| Material | Tensile Shear Strength (N/mm$^2$) | Comparison Tensile Shear Strength (N/mm$^2$) |
| --- | --- | --- |
| Aluminum | 12.8 | (6.0) |
| Steel | 13.1 | (6.0) |
| Copper | 6.2 | (1.1) |
| Nitrile rubber | 10.2 | (2.9) |
| Polyvinyl chloride (rigid) | 6.2 | (1.9) |
| Polystyrene | 6.4 | (2.3) |

EXAMPLE 8

The tensile shear strength values in N/mm$^2$ of bonds formed from the melt on various metals are shown in Table 3 below for the products of Examples 3 to 6:

TABLE 3

| Product of | Al | Cu | Fe |
| --- | --- | --- | --- |
| Example 3 | 8.4 | 4.0 | 7.5 |
| Example 4 | 10.1 | 6.9 | 11.3 |
| Example 5 | 19.0 | 8.4 | 21.4 |
| Example 6 | 15.8 | 9.8 | 18.9 |

Although the present invention has been described in terms of a number of specific examples and embodiments thereof, it will be appreciated by those skilled in the art that a wide of variety of equivalents may be substituted for the specific parts and steps of operation described herein, all without departing from the spirit and scope of the present invention, as defined in the appended claims.

We claim:

1. A method of making a thermoplastic poly(amide-urethane) block copolymer having excellent flexibility at low temperatures and excellent adhesion properties, comprising reacting:
   (a) a substantially linear polyamide having terminal groups selected from the group consisting of carboxyl and amino groups, the polyamide being obtained by reacting a dimerized fatty acid and an aliphatic or a cycloaliphatic diamine; and
   (b) one or more prepolymers selected from the group consisting of substantially linear, isocyanate-terminated aliphatic polyethers and reaction products of said aliphatic polyethers with 2,3-epoxy propanol;

to form a block copolymer product containing substantially no free isocyanate groups or epoxide groups.

2. The method as defined in claim 1, wherein the substantially linear polyamide comprises a condensation reaction product of from about 20 to 49.5 mole % of a dimerized fatty acid, from about 0.5 to 15 mole % of a monomeric fatty acid having a chain length of from about 14 to 22 carbon atoms and from about 20 to 49.5 mole % of an aliphatic or cycloaliphatic diamine containing from about 2 to 40 carbon atoms per molecule.

3. The method as defined in claim 2, wherein the diamine contains from 2 to 12 carbon atoms per molecule.

4. The method as defined in claim 1, wherein the polyamide has acid and amine numbers in the range of from about 0.3 to 50.

5. The method as defined in claim 4, wherein the acid and amine numbers of the polyamide are in the range of from about 1 to 15.

6. The method as defined in claim 1, wherein the isocyanate-terminated aliphatic polyether is derived from a polyether glycol.

7. The method as defined in claim 6, wherein the polyether glycol is selected from the group consisting of polyoxypropylene and polyoxytetramethylene glycols.

8. The method as defined in claim 6, wherein the polyether glycol is derived from an OH-terminated aliphatic diol and has an average molecular weight in the range of about 300 to 4000.

9. The method as defined in claim 8, wherein the molecular weight is in the range of from about 1000 to 3000.

10. The method as defined in claim 1, including an additional step of reacting the linear isocyanate-terminated aliphatic polyether with 2,3-epoxy propanol before reacting with the polyamide.

11. The method as defined in claim 1, wherein the isocyanate-terminated polyether is produced by reacting one or more of polyoxypropylene glycol and polyoxytetramethylene glycol with a diisocyanate selected from the group consisting of tolylene and diphenylmethane diisocyanates.

* * * * *